United States Patent
et al.

(10) Patent No.: US 11,615,330 B2
(45) Date of Patent: Mar. 28, 2023

(54) VIRTUAL SUBJECT MATTER EXPERT PROVISIONING

(71) Applicant: KYNDRYL, INC., New York, NY (US)

(72) Inventors: Rajmohan ., Thalasserry (IN); Suresh Kumar Thangavelu, Coimbatore (IN); Manjit Krishnan Kappal, Bengaluru (IN); Biju Punathichi Kandiyil, Banguluru (IN); Roy Jacob, Bangalore (IN); Pramod Vadayadiyil Raveendran, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 509 days.

(21) Appl. No.: 16/823,260

(22) Filed: Mar. 18, 2020

(65) Prior Publication Data

US 2021/0295187 A1 Sep. 23, 2021

(51) Int. Cl.
| | |
|---|---|
| *G06F 3/048* | (2013.01) |
| *G06N 5/043* | (2023.01) |
| *G06Q 30/016* | (2023.01) |
| *G06N 5/022* | (2023.01) |
| *G06N 20/00* | (2019.01) |

(52) U.S. Cl.
CPC .............. *G06N 5/043* (2013.01); *G06N 5/022* (2013.01); *G06N 20/00* (2019.01); *G06Q 30/016* (2013.01)

(58) Field of Classification Search
CPC ........ G06N 5/043; G06N 20/00; G06N 5/022; G06Q 30/016
See application file for complete search history.

(56) References Cited

U.S. PATENT DOCUMENTS

| | | | |
|---|---|---|---|
| 10,387,793 B2 | 8/2019 | Allen et al. | |
| 11,513,781 B2 * | 11/2022 | Nagar | .......... G06N 20/00 |
| 11,531,643 B2 * | 12/2022 | Yokoi | .......... G06F 16/168 |
| 2010/0233157 A1 | 9/2010 | Kalsi | |
| 2014/0278623 A1 * | 9/2014 | Martinez | .......... G06F 8/36 |
| | | | 705/7.12 |

(Continued)

OTHER PUBLICATIONS

Tecuci, G. et al., "Teaching virtual experts for multi-domain collaborative planning," In Journal of Software, Mar. 2008, vol. 3, No. 3, pp. 38-59.

(Continued)

*Primary Examiner* — David Phantana-angkool
(74) *Attorney, Agent, or Firm* — Daniel C. Housley

(57) ABSTRACT

Provisioning a virtual subject matter expert (SME) can include hosting the virtual SME on computer hardware communicatively coupled with a data communications network. The virtual SME can comprise a set of actions that are configured by a technology vendor. As configured, the actions can support a technology that is supplied to a client by the technology vendor. Access to the virtual SME can be provided on a provisioning platform communicatively coupled to the data communications network. The virtual SME can be provisioned to the client in response to a request from the client conveyed via the data communications network. The virtual SME can be provisioned to the client by operatively coupling the virtual SME with an enterprise information technology domain that includes the technology supplied to the client by the technology vendor.

14 Claims, 6 Drawing Sheets

(56) References Cited

U.S. PATENT DOCUMENTS

| | | | | |
|---|---|---|---|---|
| 2014/0280961 A1* | 9/2014 | Martinez | ............... | H04L 41/40 |
| | | | | 709/226 |
| 2015/0235309 A1* | 8/2015 | Malhotra | ............... | G06Q 20/34 |
| | | | | 705/35 |
| 2015/0302303 A1* | 10/2015 | Hakim | ............... | G06Q 10/063 |
| | | | | 706/11 |
| 2016/0148114 A1* | 5/2016 | Allen | ............... | G06N 5/02 |
| | | | | 706/11 |
| 2017/0068895 A1* | 3/2017 | Kil | ............... | G09B 5/12 |
| 2017/0154445 A1* | 6/2017 | Maruhashi | ............... | G06N 7/005 |
| 2018/0075368 A1* | 3/2018 | Brennan | ............... | G06N 20/00 |
| 2018/0096247 A1* | 4/2018 | Maruhashi | ............... | G06N 3/084 |
| 2019/0080236 A1* | 3/2019 | Maruhashi | ............... | G06K 9/6262 |
| 2019/0087384 A1* | 3/2019 | Goto | ............... | G06N 20/00 |
| 2019/0245888 A1* | 8/2019 | Martinez | ............... | H04L 63/20 |
| 2019/0279039 A1* | 9/2019 | Umeda | ............... | G06F 18/24133 |
| 2020/0057945 A1* | 2/2020 | Kil | ............... | G09B 5/12 |
| 2020/0151574 A1* | 5/2020 | Matsuo | ............... | G06N 3/084 |
| 2020/0265356 A1* | 8/2020 | Lee | ............... | G06F 17/18 |
| 2020/0387825 A1* | 12/2020 | Khan | ............... | G06F 16/335 |
| 2021/0012288 A1* | 1/2021 | Mroczka | ............... | G06Q 10/06375 |
| 2021/0026697 A1* | 1/2021 | Peter | ............... | G06K 9/6269 |
| 2021/0089933 A1* | 3/2021 | Song | ............... | G09B 7/04 |
| 2021/0110299 A1* | 4/2021 | Bisson-Krol | ............... | G06N 3/105 |
| 2021/0192972 A1* | 6/2021 | Acharya | ............... | G09B 19/003 |
| 2021/0295187 A1* | 9/2021 | Rajmohan | ............... | G06N 5/043 |
| 2021/0390144 A1* | 12/2021 | B M S | ............... | G06N 3/0445 |
| 2022/0012750 A1* | 1/2022 | Bowers | ............... | G06F 21/31 |
| 2022/0036205 A1* | 2/2022 | Kallappa | ............... | G06N 5/022 |
| 2022/0076161 A1* | 3/2022 | Takada | ............... | G06F 7/48 |
| 2022/0092481 A1* | 3/2022 | Neithalath | ............... | G06N 5/04 |
| 2022/0215286 A1* | 7/2022 | Luz Xavier Da Costa | ............... | |
| | | | | G06N 3/045 |

OTHER PUBLICATIONS

Jones, L., "Detecting Faults: Virtual Experts Bridge Gap in Engineering Industry," [online] © University of Lincoln, Aug. 2, 2018, retrieved from the Internet: <https://www.lincoln.ac.uk/news/2018/08/1479.asp>, 6 pg.

"Evolutionary Virtual Expert System," [online] EPSRC Grant EP/R029741/1, Lincoln School of Engineering, [retrieved Nov. 28, 2019], retrieved from the Internet: , 2 pg.

* cited by examiner

300

---

Host virtual subject matter expert (SME), the virtual SME comprising a set of actions that are configured by a technology vendor and that, as configured, are capable of supporting a technology that is supplied to a client by the technology vendor

302

↓

Provide access to the virtual SME on a provisioning platform communicatively coupled to the data communications network

304

↓

In response to a request from the client conveyed via the data communications network, provision the virtual SME to the client by operatively coupling the virtual SME with an enterprise information technology (IT) domain that includes the technology supplied to the client by the technology vendor

VIRTUAL SUBJECT MATTER EXPERT PROVISIONING

BACKGROUND

This disclosure relates to enterprise information systems and applications, and more particularly, to automated support for such systems and applications.

Various organizations increasingly rely on enterprise information technology (IT) for integrating and performing a wide array of diverse computer-based functions. These organizations include businesses, governmental entities, schools, interest-based user groups, and non-profit organizations. The range of functions performed by a business, for example, using business-oriented enterprise application software include online merchandizing, automated billing, payment processing, customer relationship management, supply chain management, human resource management, and financial management, as well as diverse banking and manufacturing functions.

SUMMARY

In one or more embodiments, a method can include hosting, on computer hardware communicatively coupled with a data communications network, a virtual subject matter expert (SME). The virtual SME can comprise one or more actions that are configured by a technology vendor. As configured the one or more actions can support a technology that is supplied to a client by the technology vendor. The method also can include providing access to the virtual SME on a provisioning platform communicatively coupled to the data communications network. Additionally, the method can include provisioning the virtual SME to the client in response to a request conveyed via the data communications network. The virtual SME can be provisioned by operatively coupling the virtual SME with an enterprise information technology domain that includes the technology supplied to the client by the technology vendor.

In one or more embodiments, a system includes a processor configured to initiate operations. The operations can include providing access to a virtual SME that is hosted on a provisioning platform communicatively coupled to a data communications network. The virtual SME can comprise one or more actions that are configured by a technology vendor and that, as configured, can support a technology that is supplied to a client by the technology vendor. The operations also can include provisioning the virtual SME to the client in response to a request conveyed via the data communications network. The virtual SME can be provisioned to the client by operatively coupling the virtual SME with an enterprise information technology IT domain that includes the technology supplied to the client by the technology vendor.

In one or more embodiments, a computer program product includes one or more computer-readable storage media and program instructions collectively stored on the one or more computer-readable storage media, the program instructions executable by a processor to cause the processor to initiate operations. The operations can include providing access to a virtual SME that is hosted on a provisioning platform communicatively coupled to a data communications network. The virtual SME can comprise one or more actions that are configured by a technology vendor and that, as configured, can support a technology that is supplied to a client by the technology vendor. The operations also can include provisioning the virtual SME to the client in response to a request conveyed via the data communications network. The virtual SME can be provisioned to the client by operatively coupling the virtual SME with an enterprise information technology IT domain that includes the technology supplied to the client by the technology vendor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is flowchart of method of provisioning various subject matter experts according to an embodiment.

DETAILED DESCRIPTION

Figure 1:
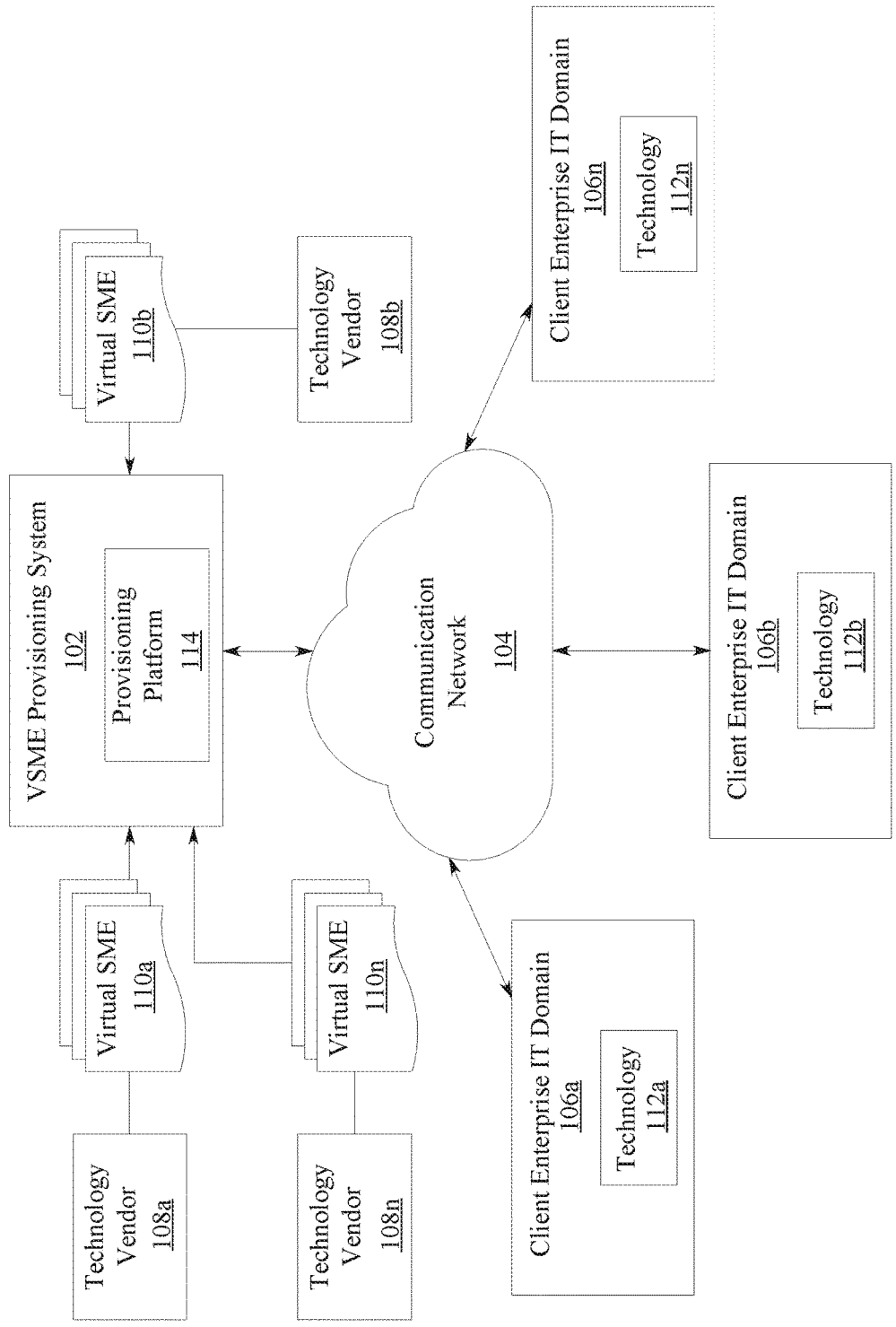
FIG. 1 depicts an example communications and computing environment in which a virtual subject matter expert provisioning system operates according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to enterprise IT systems and applications, and more particularly, to automated support for such systems and applications. An enterprise IT domain often comprises multiple technologies, implemented in both hardware and software. For example, the technology can include a suite of tools intended to integrate the many different types of hardware and software that an enterprise utilizes, such as different types of operating systems, databases, middleware, special-purpose application software, and the like. Such technologies can be customizable so that the technologies can be adapted to meet the particular needs of a specific enterprise.

Generally, though, the complexity and/or newness of such technologies (hardware or software) can require the capabilities of specialists having specific knowledge about the technologies, such as how the technologies can be properly integrated into and perform optimally within an enterprise's specific IT domain. An enterprise may need different types of support personnel having different levels of skills with respect to a diverse array of technologies. Thus, for newly marketed technologies or existing technologies newly introduced to the enterprise, the enterprise may need to hire additional support specialists or contract with one or more third-party service providers to support the technologies. Often, though, a technology may have too small a footprint to make it economical for the enterprise to hire or contract for the needed support. Moreover, some newly introduced technologies may be so new that the needed support may not yet be available at any price.

In accordance with the inventive arrangements disclosed herein, various virtual SMEs can be provisioned to various enterprises to provide automated support for various technologies within each of the various enterprise's IT domains. A virtual SME automates the support of a technology so that integrating or improving the performance of the technology can be accomplished without the intervention of an individual specifically skilled in the technology. Different virtual SMEs can provide different levels of automation and expertise for virtually any type of technology (hardware and software), such as various operating systems, database management, firmware, middleware, special-purpose software, and various other technologies.

A virtual SME, in certain embodiments, is implemented as a virtual agent (or "virtual engineer") that automatically performs support services related to a specific technology and/or provides guidance to a user of the specific technology. As described herein, the virtual SME as virtual agent or engineer optionally is implemented with artificial intelligence. As a virtual agent or engineer, the virtual SME performs one or more predetermined tasks, the performance of which are measured according to established criteria. Using machine learning, the performance improves with learning as the virtual SME repeatedly performs the one or more tasks. As a virtual agent, the virtual SME can use natural language processing (NLP) to understand natural language voice commands.

One aspect of the arrangements disclosed herein is a virtual SME (VSME) provisioning platform communicatively coupled to a data communication network. The VSME provisioning platform provides a platform with which multiple technology vendors (e.g., OEM vendors, technology support vendors and the like) can create and update virtual SMEs for the technologies that the vendors provide to their clients. In some embodiments, the VSME provisioning platform operates as a publish-subscribe system. Technology vendors' clients—enterprises whose enterprise IT domains vary in size and complexity—can access and provide feedback on a wide array of virtual SMEs of varying complexity and supporting different technologies. In certain embodiments, one or more such virtual SME can be provisioned to an enterprise as a containerized application that is deployed in a deployment portal within an enterprise IT domain and that is configured to perform a set of actions. In other embodiments, such virtual SMEs can be provisioned in other forms. For example, one or more virtual SMEs can be deployed on any general computer system on top of an operating system (OS) running on bare metal, on one or more virtual machines (VMs), or the like. The actions implemented by a virtual SME support a corresponding technology and can perform different tasks, ranging from tasks of varying complexity performed by a single virtual SME to highly complex tasks cooperatively performed by multiple SMEs operatively coupled to one another.

As defined herein, an "action" is one or more computer system-executable instructions (software) that cause certain hardware and/or other software to perform an operation in a specific manner. Relatedly, as defined herein, an action "supports" a technology (hardware and/or software) by (i) setting or modifying one or more operational parameters of the technology in response to a sub-optimal performance, wherein the performance is measured according to predetermine criteria and the setting or modifying causes an improvement in the performance as measured according to the predetermined criteria; or (ii) generating a recommendation to one or users for setting or modifying one or more operational parameters of the technology in response to a sub-optimal performance, with the likelihood that doing so will cause an improvement in the performance of the technology as measured according to the predetermined criteria.

The different sets of actions performed by different virtual SMEs are defined by technology vendors to support instances of the vendors' respective technologies within an enterprise IT environment. The actions performed by a virtual SME can be performed with little or no human intervention. An enterprise is thus able to integrate new technologies and enhance performance of existing technologies without individuals who are experts. In instances in which tasks require human interaction, a virtual SME can provide expert-level support for technology by interacting with an individual having only a basic or general knowledge about an enterprise's IT infrastructure.

Another aspect is deployment of virtual SMEs using a deployment portal that provides standard interfaces, or application programming interfaces APIs, which connect to various tools, such as ticketing tools, system and server management tools, service management tools, orchestration and automation tools, authentication and authorization tools, and the like.

A virtual SME can be automatically operated, for example, through an automation tool or by container orchestration tool that allows users to define how to coordinate containers in a cloud-based environment in which multi-container packaged applications are deployed. Optionally, a virtual SME can be operated manually. A virtual SME, if operated manually, can respond to text-based instructions and/or voice instructions that are converted to text by a speech-to-text processor and parsed by an NLP parser. Accordingly, each virtual SME can be integrated with respective technologies and execute actions for performing tasks as directed by authorized users onboarded to the deployment platform within an enterprise IT domain. Optionally, a virtual SME integrated with the deployment portal also can provide status updates on corresponding technologies.

Using machine learning, a virtual SME can discover aspects of one or more enterprise IT environments in which the SME is deployed and can learn the tasks the virtual SME performs over time. The learning can be used to provide recommendations and/or establish guidelines related to optimal performance of corresponding technologies. The learning can be transferred across various enterprise IT domains and shared with various clients of the technologies' vendors. Data analytics can be generated from data collected by the virtual SMEs deployed to various enterprise IT domains (e.g., tasks performed for various clients by the same virtual SME in different enterprise IT domains). Based the data analytics, one or more recommendations can be generated for one or more clients, one or more technology vendors, and/or one or more cloud service providers of a technology hosted in a cloud or hybrid cloud environment.

The arrangements described herein are directed to computer technology and provide an improvement to computer technology. Specifically, the present arrangements improve the integration of new computer technologies into an enterprise IT domain and facilitate operation of the newly added computer technologies once integrated in the enterprise IT infrastructure. In one aspect, the present arrangements automate tasks that otherwise would require human action. The automated tasks enable integration of and support for computer technologies to be accomplished more rapidly and more efficiently with little or no human action.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity.

FIG. 1 depicts example communications and computing environment 100, in which VSME provisioning system 102 is operable according to certain embodiments. VSME provisioning system 102 can comprise a publish-subscribe system that runs on one or more computer systems of a computing node, such as computer system 612 of computing node 600 described below with reference to FIG. 6. VSME provisioning system 102 in certain embodiments is implemented in software that runs on a server within a cloud or hybrid cloud environment. In addition to VSME provisioning system 102, communications and computing environment 100 illustratively includes data communications network 104. Data communications network 104 can comprise the Internet, a wide area network (WAN), local area network (LAN), and/or other communications network for transmitting data between computing nodes over cable (e.g., twisted-pair cable, fiber optic cable) and/or wirelessly (e.g., via Wi-Fi, microwave, free-space optical).

VSME provisioning system 102 can communicatively couple via data communications network 104 to client enterprise IT domain 106a, client enterprise IT domain 106b, and client enterprise IT domain 106n. Although only three such enterprise IT domains are shown, it will be readily appreciated that a greater or lesser number of enterprise IT domains can communicatively couple to VSME provisioning system 102 via data communications network 104. As defined herein, an "enterprise IT domain" comprises a combination of computer hardware and software that provides a technology platform for integrating and coordinating multiple processes within an organization. Accordingly, client enterprise IT domains 106a-106n can include any type of IT that facilitates the functioning of a business organization's or other enterprise's operations by integrating and coordinating multiple computer processes. Client enterprise IT domains 106a-106n are operated by enterprises that, as clients of one or more technology vendors, integrate within the respective enterprise IT domains various technologies acquired from the one or more technology vendors.

VSME provisioning system 102 illustrates a platform for technology vendors, illustratively including technology vendor 108a, technology vendor 108b, and technology vendor 108n. Technology vendors 108a-108b use the platform provided by VSME provisioning system 102 to develop, store, and/or update virtual SME 110a, virtual SME 110b, and virtual SME 110n, respectively. Although only three technology vendors and corresponding virtual SMEs are shown, it will be readily understood that a greater or lesser number of vendors can develop, store, and/or update a greater or lesser number of virtual SMEs on VSME provisioning system 102. Moreover, each vendor can develop, store, and/or update multiple virtual SMEs on VSME provisioning system 102.

Virtual SMEs 110a-110n support vendor-supplied technologies, illustrated herein by technology 112a integrated in enterprise domain 106a, technology 112b integrated in enterprise domain 106b, and technology 112n integrated in enterprise domain 106n. In support of a technology (hardware or software), a virtual SME performs one or more actions belonging to a set of actions defined by the vendor (or vendor's partner) of the technology that the virtual SME is configured to support. The actions, as described below, can involve different levels of complexity, and different virtual SMEs can perform different actions corresponding to the different levels of complexity.

As a publish-subscribe system, VSME provisioning system 102 enables a technology vendor's clients to subscribe to the system and to select among multiple virtual SMEs, each selection based on the specific technology utilized as well as the complexity of the support needed by each of the clients. The VSME provisioning system 102, as a publish-subscribe system, enables technology vendors' clients to select specific virtual SMEs, authorize payment, and access the virtual SMEs selected. Optionally, VSME provisioning system 102 can incorporate or integrate a payment mechanism (not shown) that is invoked by a client to make a payment.

VSME provisioning system 102 optionally can incorporate or integrate with a feedback mechanism that the client can use to provide feedback to technology vendors regarding different virtual SMEs. Feedback for instance can pertain to the ease of use, reliability, accuracy, security, or other aspects of a virtual SME. VSME provisioning system 102 can generate ratings based on the feedback. The ratings provide an indicator for each virtual SME's performance and can be used by a prospective client to evaluate a virtual SME before paying to access the virtual SME through VSME provisioning system 102.

VSME provisioning system 102, in certain embodiments, operates within a cloud or hybrid cloud environment to provide a Platform as a Service. As such, VSME provisioning system 102 provides to technology vendors, via a data communications network, the hardware and/or software tools to develop, deliver, and update virtual SMEs.

Operatively, VSME provisioning system 102 hosts each virtual SME developed by a technology vendor, each such virtual SME configured to support a technology supplied to one or more clients by the vendor. VSME provisioning system 102, in certain embodiments, provides access to each virtual SME on provisioning platform 114, which can run on a server (e.g., cloud-based server) that supports VSME provisioning system 102 and is communicatively coupled to data communications network 104. A virtual SME (110a, 110b, and/or 110n) is provisioned to a client in response to a request from the client conveyed via data communications network 104. The virtual SME is provisioned to the client by operatively coupling the virtual SME with an enterprise IT domain (106a, 106b, and/or 106n) that includes the technology (112a, 112b, and/or 112n) supplied to the client by the vendor. As defined herein, "operatively coupling" a virtual SME with an IT domain means enabling the virtual SME and one or more elements of the IT domain to exchange data to jointly accomplish a task, the virtual SME and one or more IT elements each performing one or more separate actions. The virtual SME can run on the platform or be downloaded to a client deployment platform for deploying the virtual SME in the enterprise IT domain.

Virtual SME 110*a*, 110*b*, and/or 110*n* can be provisioned as a containerized application—that is, as a discrete unit of software comprising one or more microservices packaged in combination with libraries, configurations, and dependencies in a manner that enables the software to run virtually anywhere whether on premises, at a third-party data center, or in a cloud-based computing environment. As a containerized application, virtual SME 110*a*, 11*b*, and/or 110*n* can be deployed through a deployment portal. The deployment portal provides standard interfaces, or application program interfaces (APIs), that enable a virtual SME to operatively couple to various tools, such as ticketing tools, system and/or server management tools, service management tools, and container orchestration tools, as well as authentication and/or authorization tools. The tools, as described more fully below, facilitate integration of virtual SME 110*a*, 110*b*, and/or 110*n* with the technologies each is configured to support and execution of the actions each is configured to perform. Additionally, the various tools can be updated through the deployment portal.

Figure 2:
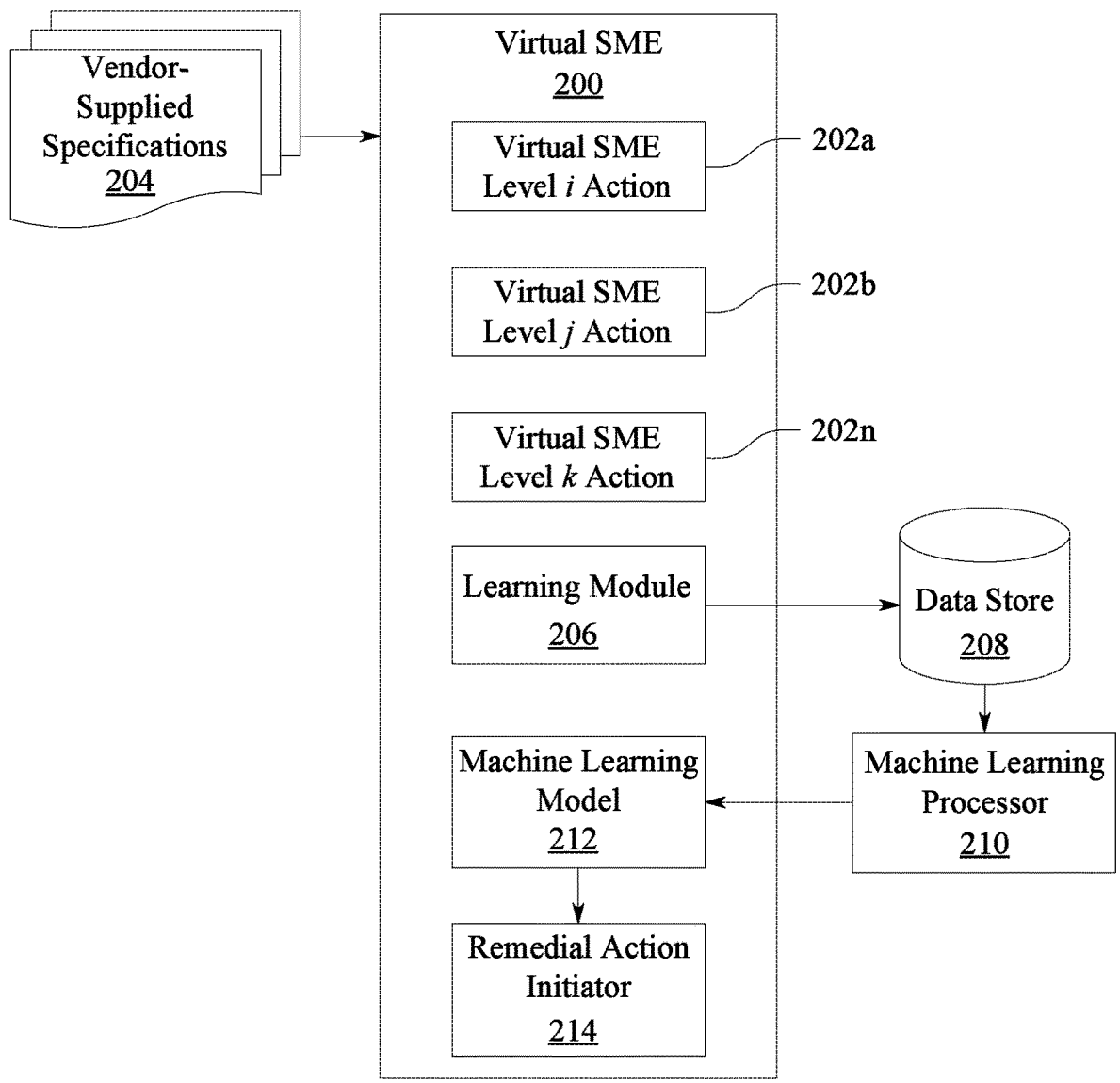
FIG. 2 depicts an example virtual subject matter expert according to an embodiment.

Referring additionally to FIG. 2, example virtual SME 200 is depicted in accordance with an embodiment. Illustratively, virtual SME 200 includes a set of actions—action 202*a*, action 202*b*, and action 202*n*. Although three actions are shown, SME 200 can comprise a greater or lesser number of actions. Actions 202*a*-202*n* each correspond to a specific level—levels i, j, and k, respectively—wherein the level corresponds to a level of complexity of the task that is intended to be accomplished by executing the corresponding action. Actions 202*a*-202*n* are configured based on vendor-supplied specifications 204, which are supplied by a vendor of the technology that virtual SME 200 is configured to support. Actions 202*a*-202*n* can be implemented in computer system-executable instructions that run on one or more computers, such as computer system 612 described in reference to FIG. 6. The one or more computer systems are part of an enterprise IT domain that includes the technology (hardware and/or software) that virtual SME 200 is configured to support.

Virtual SME 200 performs certain tasks with execution of one or more of actions 202*a*-202*n*. Tasks can include, for example, modifying a kernel parameter or system-user attributes, increasing a file system size, changing a file system's settings, performing a file system cleanup, performing a specific task related to a special-purpose application, performing initial diagnostics on a system, and/or other more or less complex tasks in support of a specific, vendor-supplied technology.

In certain embodiments, virtual SME 200 further includes learning module 206. Learning module 206 can be implemented in computer system-executable instructions that run on one or more computers within an enterprise IT domain. In certain embodiments, learning module 206 captures data and generates, based on the data, various data analytics. Learning module 206 can learn aspects of an IT environment in which the technology supported by virtual SME 200 operates, as well as data related to the technology's performance. Learning module 206 of Virtual SME 200 (operating on-premise or at a vendor premise), for example, can learn the frequency with which a set of actions is performed, the time taken to perform the actions, the types of applications running, a necessary file size for a specific application, and the like. Learning module 206 can acquire the learning based on activities (e.g., requests to increase file system sizes) across multiple environments and enterprise IT domains, even those of multiple clients using similar applications. Based on the learning, learning module 206 can provide recommendations and/or guidelines such as changes to sizes of standard offerings (e.g. "medium-sized" OSI requires 8 GB memory rather than the current 6 GB or the XYZ application requires OSI). Learning module 206 thus can enable clients, as well as technology vendors and service providers, to devise standards and provide technologies that are optimized based on general client/application requirements. Learning module 206 is an application of transfer learning, which can, for example, facilitate machine learning and applies learning gained from solving one set of problems to different but related problems across various enterprise IT domains and involving different clients.

Learning module 206 (or, optionally, a distinct data analytics module) of virtual SME 200 can perform various types of data analysis. Data analysis can be performed on-premise at a client site and/or offsite, such as at technology vendor's site, after conveyance to the site by virtual SME 200. Data analysis and/or learning performed on-premise, for example, can be performed in the deployment portal of an enterprise IT domain depending on the need for computing resources. Such domain-specific learning and/or data analysis can be performed offsite on a client's data (excluding sensitive data) that is conveyed to a technology vendor site. Data analysis and learning performed at a technology vendor site based on captured data (excluding sensitive data) from a client can benefit from vendor's sites capacity to perform data analytics and learning on large data sets, for example. With the learning module 206 (or, alternatively, data analytics module) part of the deployment portal of the enterprise IT domain requests to perform the various analytical and learning functions can be received through deployment portal from various ticketing and/or automation tools, described below.

In other embodiments, learning model 206 relays captured data to data store 208 via data communications network 104. The data store can be integrated in or communicatively coupled to VSME provisioning system 102, which optionally can include or be operatively coupled to a data analytics component (not shown) for performing data analytics on the relayed data. The data captured and used to generate data analytics can include, for example, machine performance data recorded in one or more system-level logs of one or more computer systems running within an enterprise IT domain.

Learning module 206, or an off-premise analyzer integrated in or operatively coupled to VSME provisioning system 102, can generate data analytics based on, for example, the frequency with which the set of actions 202*a*-202*n* (or a subset of actions) is performed, the amount of time necessary to perform the action(s), the types of applications running concurrently with performance of the action(s), and the like. Based on data analysis, characteristics of the enterprise IT domain and corresponding actions performed by the virtual SME supporting the technology over a predetermined time interval are thus learned. Virtual SME 200, or VSME provisioning system 102 operatively coupled thereto, can generate based on the data analytics a recommendation recommending a change to one or more operational parameters of the enterprise IT domain to improve performance of the technology supported by virtual SME 200. The recommendation can concern computer hardware, such as "medium" sized OSI requires 8 GB of memory instead of 6 GB, for example. The recommendation can concern software, such as the XYZ application facilitates a "large" sized OSI. The recommendation provides the client with insight on how to modify the enterprise IT domain to improve the performance of technologies and can be used by the vendor to update a technology or corresponding virtual SME and/or to introduce a new technology or virtual SME.

Similarly, the data analytics can be used by VSME provisioning system 102 to generate guidelines. The guidelines, for example, can revise standards (e.g. for "medium" sized OSI, use 8 GB of memory instead of 6 GB) or establish new ones (e.g., incorporate an XYZ application with any "large" sized OSI). The guidelines can establish standards to optimize the corresponding technologies. Cloud-based technology vendors, for example, can update standard catalogs of technologies provided and/or modify specific properties of one or more catalog items based on the guidelines or recommendations. The guidelines can be conveyed by VSME provisioning system 102 to multiple clients and their vendors, with the result that the learning is transferred across multiple enterprise IT domains. The learning transferred across multiple enterprise IT domains can be used by clients and their vendors for modifying or updating technologies and/or virtual SMEs that support the technologies.

In certain embodiments, virtual SME 200 is granted specific privileges to modify a technology operating in an enterprise IT domain. Virtual SME 200 can modify the technology according to a recommendation or guideline in response to determining a current configuration of the technology does not match criteria provided by the recommendation or guideline. The modifying can encompass various modifications, such as for example, modifying a kernel parameter or system-user attributes, increasing memory, increasing a file system size, changing a file system's settings and/or other modifications. Virtual SME 200 also can be granted specific privileges for performing certain tasks, such as for example, performing a file system cleanup, performing a specific task related to a special-purpose application, performing initial diagnostics on a system, and/or other tasks in support of a specific, vendor-supplied technology.

In still other embodiments, if virtual SME 200 is provisioned to multiple clients, learning module 206 can capture data across multiple enterprise IT domains that use the underlying technology that virtual SME 200 supports. Data analytics can be generated by learning module 206 and/or a data analytics component integrated in or operatively coupled with VSME provisioning system 102, the data analytics based on the data captured from each of the multiple enterprise IT domains. One or more recommendations and/or guidelines can be generated based on the data analytics to generate learning derived from various enterprise IT domains with respect to the technology supported by virtual SME 200.

The data captured by learning module 206 can include operational parameters and associated performance metrics relating to the underlying technology that virtual SME 200 supports. The data thus can characterize the performance of a technology operating under different conditions. Data captured across multiple enterprise IT domains can provide a rich source of training and test data for generating one or more models using machine learning.

In certain embodiments, transfer learning techniques can be utilized in conjunction with other machine learning, as noted above. Transfer learning can be clubbed with an enterprise IT domain deployment portal or as a combination of containerized microservices or services leveraged from other systems, including ones operating in a cloud environment. A separate centralized site or publish-subscribe system can be used to provision the virtual SMEs, to rate the virtual SMEs, and/or provide feedback to one or more technology vendors of the virtual SMEs.

The data captured by learning module 206 can be used to generate a machine learning multi-class classification model, for example. A multi-class classification model based on a specific set of operational parameters can predict the operating performance of a technology supported by virtual SME 200 under various conditions.

In certain embodiments, the multi-class classification model is generated by machine learning processor 210 that is integrated in or operatively coupled to VSME provisioning system 102. Machine learning processor 210 creates training and test data using data captured across multiple enterprise IT domains by learning module 206 and electronically stored in data store 208. The training and test data can comprise feature vectors whose elements correspond to different operational parameters and performance metrics and which are labeled for generating a machine learning model using supervised learning. Using the labeled feature vectors, machine learning processor 210 generates a multi-classification model. In one or more different embodiments, the multi-class classification model generated by machine learning processor 210 can comprise a deep learning neural network, support vector machine (SVM), decision tree, or similar such classification model. In other embodiments, machine learning processor 210 can use unsupervised clustering, for example, to identify similar conditions that correspond to specific levels of performance of the technology. Machine learning processor 210 can implement various other types of machine learning as well.

Virtual SME 200, in certain embodiments, includes machine learning model 212 generated by machine learning processor 210. Virtual SME 200, executing in support of an underlying technology, can capture operational parameters and/or performance metrics generated by the operations of the underlying technology. Using machine learning model 212, virtual SME 200 can classify the performance of the underlying technology based on the operational parameters, operational behaviors, and/or performance metrics. For each classification corresponding to a sub-optimal performance, a predetermined remedy can be associated with the classification made according to machine learning model 212. The predetermined remedy can specify a corresponding remedial action, such as a change in or modification of hardware and/or software.

A remedial action can specify that virtual SME 200 be replaced by another virtual SME of the technology vendor or recommend substituting another virtual SME from the technology vendor (if not purchased by the client). A replacement or substituted virtual SME can be one that is able to perform a more complex action, for example. The remedial action, for example, can require an operative coupling of virtual SME 200 with one or more other virtual SMEs to cooperatively perform one or more actions jointly. Virtual SME 200 can include remedial action initiator 214 with which virtual SME 200 initiates a remedial action associated with the classification made by machine learning model 212. Accordingly, using remedial action initiator 214, virtual SME 200 can signal VSME provisioning system 102 to provision to the enterprise IT domain a substitute virtual SME or provision one or more complementary virtual SMEs to operatively couple with virtual SME 200. Virtual SME 200 can initiate other remedial actions with remedial action initiator 214 depending on the classification determined by machine learning model 212.

Virtual SME 200 in various embodiments is an intelligent agent implemented in a set of computer system-executable instructions and endowed with artificial intelligence. As an intelligent agent, virtual SME 200 includes a natural language processing (NLP) capability to recognize and respond to natural language voice commands. Virtual SME can use NLP to understand a spoken user instruction input to a computer system on which virtual SME 200 is executing and which include an audio capability for capturing voice utterances of the user.

Optionally, virtual SME 200 can be configured to operatively couple with one or more service management tools. For example, virtual SME 200 can be configured to operatively couple with a ticketing tool that provides an interface between a client utilizing virtual SME 200 and the vendor associated with the virtual SME or a third-party service provider. The ticketing tool can generate a ticket for each client-reported incident of a problem concerning the vendor's technology and can track incident handling until the problem is remedied.

Additionally, or alternatively, virtual SME 200 optionally can be configured to operatively couple to one or more system management tools. For example, virtual SME 200 can operatively couple with a centralized management utility that manages from a centralized location virtual machines and hypervisors that create and run virtual machines, as well as all dependent components.

Virtual SME 200 can be configured to operatively couple to service and/or system management tools that can be operated by a user having only a basic knowledge of the underlying technology supported by virtual SME 200. Alternatively, or additionally, virtual SME 200 can be configured to operatively couple to service and/or system management tools that operate under the direction of the virtual SME, which, as configured can recognize and implement voice commands for performing a specific action.

Virtual SME 200 can be updated with vendor-provided software conveyed to a client over a data communications network. An update can modify existing vendor-defined actions or comprise new actions that are performed by virtual SME 200. An update can add or modify various features (e.g., security). Updating can be performed as part of a continuous or semi-continuous improvement process. Virtual SME 200 can be configured to allow a client to enable the automatic updating of virtual SME 200 provided as a containerized application through automatic downloading of one or more vendor-provided modifications. Virtual SME 200 alternatively can be updated manually by the user.

Updates to virtual SME 200 can be based on feedback provided to vendors by clients regarding, for example, the ease of use, reliability, accuracy, security, or other aspects of a virtual SME. Additionally, or alternatively, updates to virtual SME 200 can be generated in response to specific client requests. Optionally, a rating based on client feedback (as described above) can be provided to potential clients to enable clients to evaluate a virtual SME's performance in advance of acquiring the virtual SME from a vendor. In each instance of a client request or client feedback, the request(s) and/or feedback, can be conveyed to an appropriate technology vendor via VSME provisioning system 102 and the technology vendor can use the request(s) and/or feedback to update the virtual SME, as well as develop and deploy new SMEs.

FIG. 3 is a flowchart of example method 300 for provisioning a virtual SME according to an embodiment. Method 300 can be implemented in a system the same or similar to the systems described with reference to FIGS. 1 and 2. The system at block 302 hosts a virtual SME on computer hardware that is communicatively coupled with a data communications network. In addition to hosting the virtual SME, the system optionally can be used by a vendor to develop and update the virtual SME. The system can be used by one or more vendors to develop, deploy, and operate one or more other virtual SMEs as well. Each virtual SME can comprise a set of actions that are configured by a vendor. As configured, the actions are capable of supporting a technology that is supplied to a client by the vendor.

The system at block 304 provides access to the virtual SME on a provisioning platform, the provisioning platform communicatively coupled to the data communications network. In response to a request from the client conveyed via the data communications network, the system at block 306 provisions the virtual SME to the client by operatively coupling the virtual SME with an enterprise IT domain that includes the technology supplied to the client by the vendor.

The virtual SME, in some embodiments, comprises a learning module for learning characteristics of the enterprise IT domain and corresponding actions performed by the virtual SME in supporting the technology over a predetermined time interval. The system can generate a recommendation for optimally operating the technology based on the learning. The system can generate a recommendation and/or a guideline for optimally operating the technology based on the learning and can convey the recommendation and/or guideline to the client, the technology vendor, one or more other clients and/or one or more other technology vendors.

In certain embodiments, the system can grant the virtual SME privileges to modify the technology operating in the enterprise IT domain, and the virtual SME can modify the technology according to the recommendation or guideline in response to determining that a current configuration of the technology does not match a criteria provided by the recommendation or guideline. The modifying can include, for example, modifying a kernel parameter or system-user attributes, increasing memory, increasing a file system size, changing a file system's settings and/or other modifications. The system also can also grant the virtual SME privileges for performing certain tasks, such as performing a file system cleanup, performing a specific task related to a special-purpose application, performing diagnostics on a system, and/or other complex tasks in support of the technology.

The system can provision the virtual SME to multiple clients and can generate data analytics from data collected from the virtual SME regarding actions performed by the virtual SME for each of the multiple clients. The system can generate a recommendation and/or guideline based on the data analytics.

The virtual SME can determine the complexity of a task that is performed by the virtual SME. Based on the determined complexity, the system can provision one or more additional virtual SMEs that are capable of performing one or more complex tasks. The virtual SME can operatively couple to the one or more additional virtual SMEs in supporting the technology. Alternatively, the virtual SME can recommend that the system provision a different virtual SME for supporting the technology. The system, for example, can respond to a recommendation by provisioning a different virtual SME that has greater privileges when used in the corresponding enterprise IT domain.

The system can modify the virtual SME in response to one or more client requests. The system, alternatively or additionally, can modify the virtual SME in response to client feedback. The system can configure the virtual SME to operatively couple to a service tool, a system management tool, a container orchestration system, an authorization platform, and/or an authentication system.

It is understood in advance that although this disclosure includes a detailed description on cloud computing, implementations of the teachings recited herein are not limited to a cloud computing environment. Rather, the embodiments disclosed herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
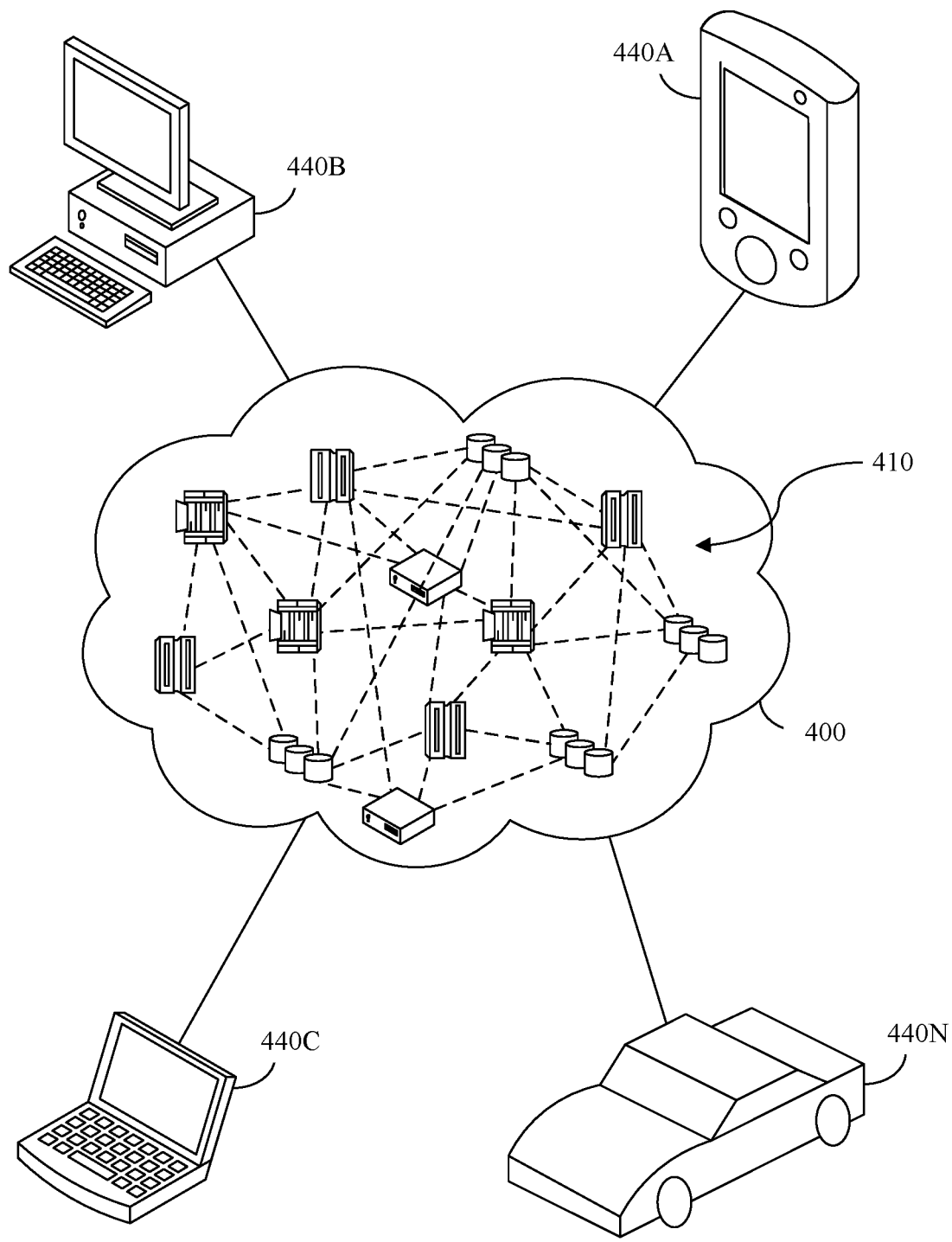
FIG. 4 depicts a cloud computing environment according to an embodiment.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454a, desktop computer 454b, laptop computer 454c, and/or automobile computer system 454n may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454a-454n shown in FIG. 4 are intended to be illustrative only and that computing nodes 410 and cloud computing environment 450 can communicate with any type of computerized device over any type of network and/or network addressable connection (e.g., using a web browser).

Figure 5:
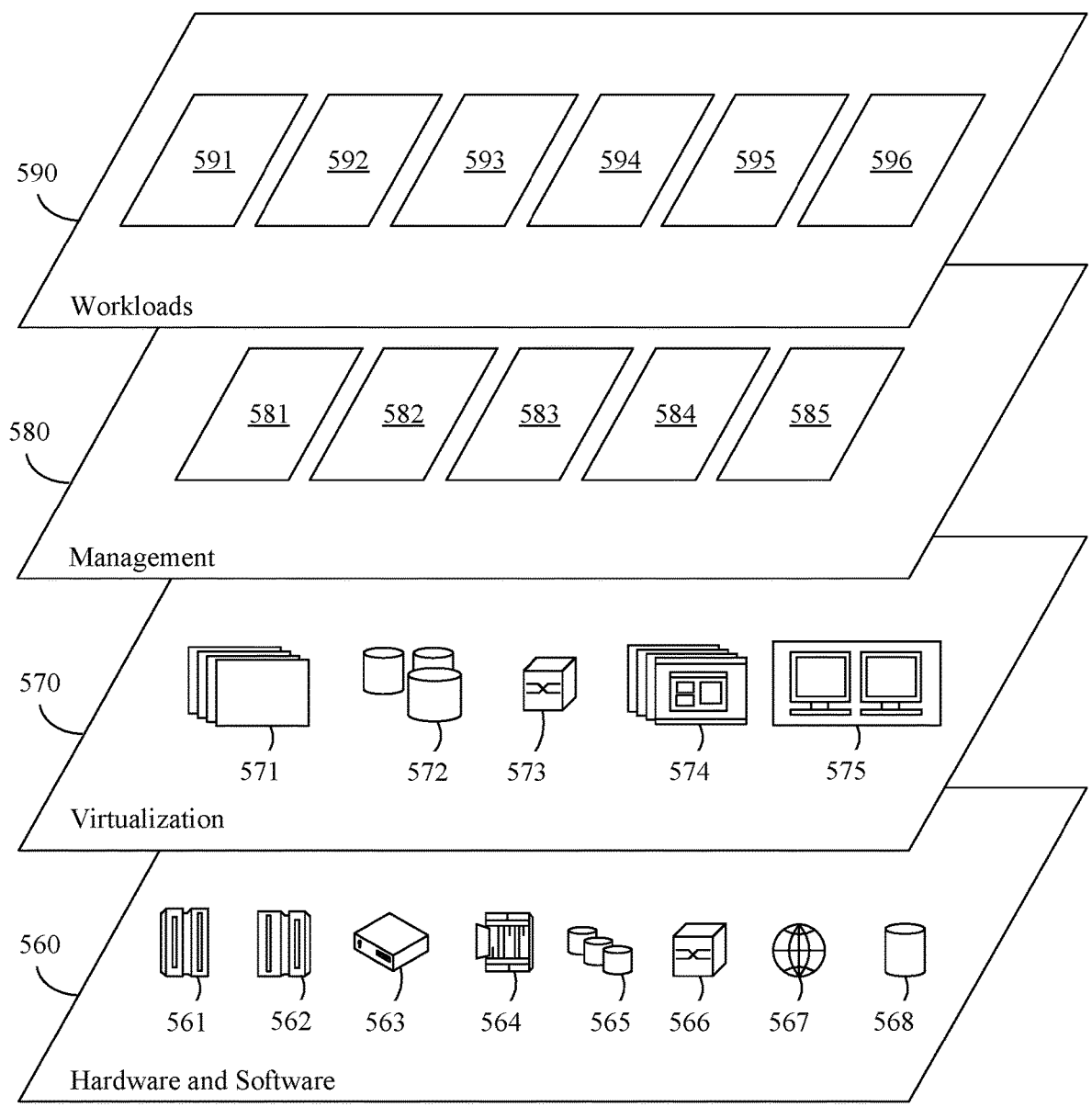
FIG. 5 depicts abstraction model layers according to an embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA. Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and virtual SME provisioning system 596.

Figure 6:
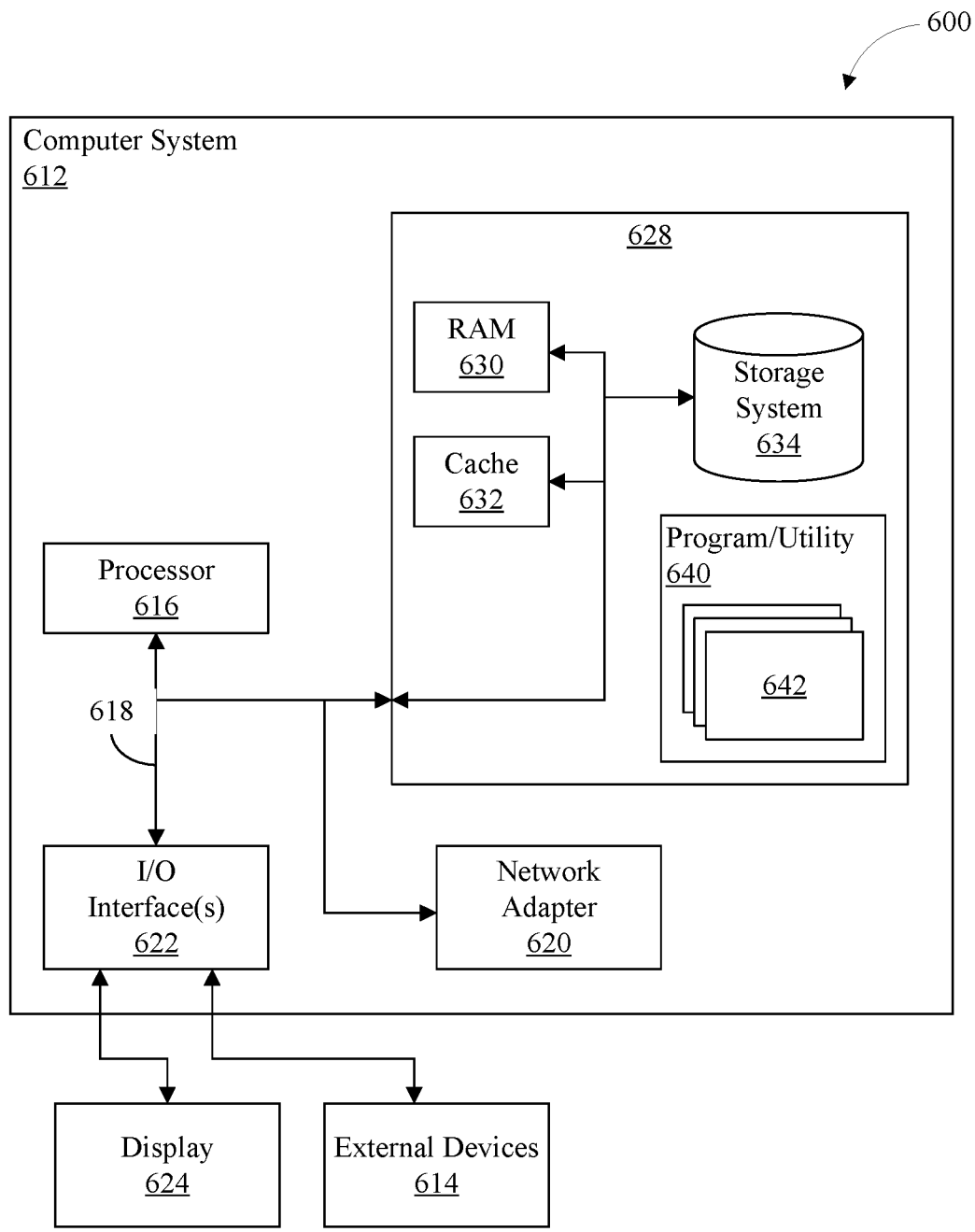
FIG. 6 depicts a computing node according to an embodiment.

FIG. 6 illustrates a schematic of an example of a computing node 600. In one or more embodiments, computing node 600 is a cloud computing node. Computing node 600 is capable of performing any of the functionality described within this disclosure. Computing node 600, however, is not intended to suggest any limitation as to the scope of use or functionality of embodiments described herein.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include system 596 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
hosting, on computer hardware communicatively coupled with a data communications network, a virtual subject matter expert (SME), wherein
the virtual SME comprises a set of actions that are configured by a technology vendor and that, as configured, are capable of supporting a technology that is supplied to a client by the technology vendor, and
the virtual SME comprises a learning module for learning characteristics of an enterprise IT domain and performance characteristics of actions performed by the virtual SME in supporting the technology over a predetermined time interval, and generating based on the learning at least one of a recommendation for operating the technology or a guideline for operating the technology;
providing access to the virtual SME on a provisioning platform communicatively coupled to the data communications network;
provisioning the virtual SME to the client in response to a request from the client conveyed via the data communications network; and
granting the virtual SME privileges to modify the technology, and wherein the virtual SME modifies the technology according to the recommendation or guideline in response to determining a current configuration of the technology does not match a criteria provided by the recommendation, wherein
the virtual SME is provisioned to the client by operatively coupling the virtual SME with the enterprise information technology (IT) domain that includes the technology supplied to the client by the technology vendor.

2. The method of claim 1, wherein
the client comprises multiple clients and the virtual SME is provisioned to each of the multiple clients across multiple different enterprise IT domains, and further comprising
performing data analytics on data collected from the virtual SME regarding actions performed by the virtual SME for each of the multiple clients and generating based on the data analytics at least one of a recommendation or a guideline.

3. The method of claim 1, further comprising
determining a complexity of a task performed by the virtual SME and, based on the determining, operatively coupling with at least one other virtual SME or recommending provisioning a different virtual SME for supporting the technology.

4. The method of claim 1, further comprising
modifying the virtual SME in response to at least one of a client request or client feedback.

5. The method of claim 1, wherein
the virtual SME is configured to operatively couple with at least one of a service management tool, a system management tool, a container orchestration system, an authorization platform, or an authentication system.

6. A system, comprising:
a processor configured to initiate operations including:
hosting, on computer hardware communicatively coupled with a data communications network, a virtual subject matter expert (SME), wherein
the virtual SME comprises a set of actions that are configured by a technology vendor and that, as configured, are capable of supporting a technology that is supplied to a client by the technology vendor, and
the virtual SME comprises a learning module for learning characteristics of an enterprise IT domain and performance characteristics of actions performed by the virtual SME in supporting the technology over a predetermined time interval, and generating based on the learning at least one of a recommendation for operating the technology or a guideline for operating the technology;
providing access to the virtual SME on a provisioning platform communicatively coupled to the data communications network;
provisioning the virtual SME to the client in response to a request from the client conveyed via the data communications network; and
granting the virtual SME privileges to modify the technology, and wherein the virtual SME modifies the technology according to the recommendation or guideline in response to determining a current configuration of the technology does not match a criteria provided by the recommendation, wherein
the virtual SME is provisioned to the client by operatively coupling the virtual SME with the enterprise information technology (IT) domain that includes the technology supplied to the client by the technology vendor.

7. The system of claim 6, wherein the client comprises multiple clients and the virtual SME is provisioned to each of the multiple clients across multiple different enterprise IT domains, and wherein the processor is configured to initiate operations further comprising
performing data analytics on data collected from the virtual SME regarding actions performed by the virtual SME for each of the multiple clients and generating based on the data analytics at least one of a recommendation or a guideline.

8. The system of claim 6, wherein the processor is configured to initiate operations further comprising
determining a complexity of a task performed by the virtual SME and, based on the determining, operatively coupling with at least one other virtual SME or recommending provisioning a different virtual SME for supporting the technology.

9. The system of claim 6, wherein the processor is configured to initiate operations further comprising
modifying the virtual SME in response to at least one of a client request or client feedback.

10. A computer program product, the computer program product comprising:
one or more computer-readable storage media and program instructions collectively stored on the one or more computer-readable storage media, the program instructions executable by a processor to cause the processor to initiate operations including:
hosting, on computer hardware communicatively coupled with a data communications network, a virtual subject matter expert (SME), wherein
the virtual SME comprises a set of actions that are configured by a technology vendor and that, as configured, are capable of supporting a technology that is supplied to a client by the technology vendor, and the virtual SME comprises a learning module for learning characteristics of an enterprise IT domain and performance characteristics of actions performed by the virtual SME in supporting the technology over a predetermined time interval, and generating based on the learning at least one of a recommendation for operating the technology or a guideline for operating the technology;

providing access to the virtual SME on a provisioning platform communicatively coupled to the data communications network;

provisioning the virtual SME to the client in response to a request from the client conveyed via the data communications network; and granting the virtual SME privileges to modify the technology, and wherein the virtual SME modifies the technology according to the recommendation or guideline in response to determining a current configuration of the technology does not match a criteria provided by the recommendation, wherein the virtual SME is provisioned to the client by operatively coupling the virtual SME with the enterprise information technology (IT) domain that includes the technology supplied to the client by the technology vendor.

11. The computer program product of claim 10, wherein the client comprises multiple clients and the virtual SME is provisioned to each of the multiple clients across multiple different enterprise IT domains, and wherein the program instructions are executable by the processor to cause the processor to initiate operations further comprising performing data analytics on data collected from the virtual SME regarding actions performed by the virtual SME for each of the multiple clients and generating based on the data analytics at least one of a recommendation or a guideline.

12. The computer program product of claim 10, wherein the program instructions are executable by the processor to cause the processor to initiate operations further comprising determining a complexity of a task performed by the virtual SME and, based on the determining, operatively coupling with at least one other virtual SME or recommending provisioning a different virtual SME for supporting the technology.

13. The computer program product of claim 10, wherein the program instructions are executable by the processor to cause the processor to initiate operations further comprising modifying the virtual SME in response to at least one of a client request or client feedback.

14. The computer program product of claim 1, wherein the virtual SME is configured to operatively couple with at least one of a service management tool, a system management tool, a container orchestration system, an authorization platform, or an authentication system.

\* \* \* \* \*